United States Patent Office 3,419,573
Patented Dec. 31, 1968

3,419,573
3-CHLORO-4-OXY-1,2,5-THIADIAZOLES, AND A PROCESS FOR PREPARING SAME
Leonard M. Weinstock, Rocky Hill, N.J., assignor to Merck & Co., Inc., Rahway, N.J., a corporation of New Jersey
No Drawing. Filed Oct. 15, 1965, Ser. No. 496,699
12 Claims. (Cl. 260—302)

This invention relates to new chemical compounds, and to methods of synthesizing such compounds. More particularly, it relates to novel thiadiazoles. Still more specifically it is concerned with 3-halo-1,2,5-thiadiazoles substituted at the 4-position with a hydroxy or hydrocarboxy radical. It is concerned also with the chemical synthesis of these novel heterocyclic substances.

Only a modest amount of work has been reported on 1,2,5-thiadiazole compounds, particularly on the formation of this heterocyclic ring system from open chain compounds. Those processes which are known suffer the limitation of affording only a relatively small class of 1,2,5-thiadiazoles substituted at the 3 and/or 4-positions of the ring. Heretofore, no method has been available for the direct synthesis from open chain compounds of 1,2,5-thiadiazoles substituted with both halogen and a hydroxy or ether function at the 3 and 4-positions. Such di-substituted thiadiazoles are highly useful compounds in that they may be employed as key intermediates in the synthesis of substances having antiparasitic and antibacterial activity.

It is an object of this invention to provide novel 3-chloro-4-substituted-1,2,5-thiadiazoles of the structure

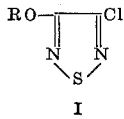

I where R is hydrogen or hydrocarbonyl. Another object is provision of a synthesis of these thiadiazoles from open chain organic compounds. A still more specific object is provision of a method for producing 3-chloro-4-hydroxy (or hydrocarbonyloxy)-1,2,5-thiadiazoles in high yield from an appropriate cyanoformimidate. An additional object is provision of a process for making 3-chloro-4-hydrocarbonyloxy-1,2,5-thiadiazoles in high yield from the 3-chloro-4-hydroxy-1,2,5-thiazoles. Other objects will become clear from the following description of this invention.

According to the present invention, it has now been found that 3-chloro-4-hydroxy-1,2,5-thiadiazoles and 3-chloro-4-alkoxyl-1,2,5-thiadiazoles are obtained by the reaction of cynanoformamide or an alkyl cyanoformimidate with a sulfur chloride. It has further been discovered that 3-chloro-4-hydrocarbonyloxy-1,2,5-thiadiazoles may be produced by treatment of 3-chloro-4-hydroxy-1,2,5-thiadiazole with a hydrocarbonylating agent. These processes, and the novel thiadiazoles thus obtained, may be represented structurally as

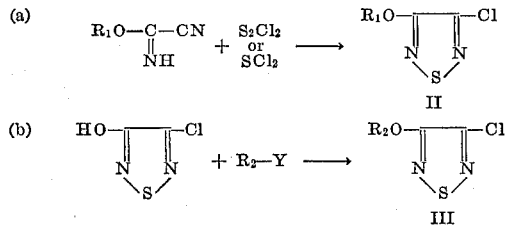

In these formulas $R_1$ represents hydrogen or a lower alkyl radical; $R_2$ represents loweralkyl, loweralkenyl, loweralkoxyalkyl, hydroxyalkyl or benzyl; and Y is defined below. Representative examples of the symbol $R_1$, in addition to hydrogen, are the loweralkyl groups methyl, ethyl, propyl, isopropyl, butyl, isobutyl and amyl. Examples of $R_2$ include the alkyl groups mentioned as illustrative of $R_1$, the benzyl radical, loweralkenyl radicals such as allyl, methallyl and crotyl, and loweralkoyalkyl groups such as β-methoxyethyl, β-ethoxyethyl and β-hydroxyethyl; Y is the anion of a strong inorganic acid such as a halide, preferably bromo, iodo or chloro.

The 3-chloro-4-hydroxy-1,2,5-thiadiazole and 3-chloro-4-alkoyl-1,2,5-thiadiazole compounds of Formula II above are prepared according to this invention by reacting sulfur monochloride or sulfur dichloride, or mixtures thereof, with cyanoformamide or a loweralkyl cyanoformimidate. The reaction is conducted in a suitable organic solvent medium under conditions discussed below.

According to this invention 3-chloro-4-hydroxy-1,2,5-thiadiazole is obtained by the reaction of cyanoformamide with sulfur mono- or di-chloride. While cyanoformamide is normally represented structurally as

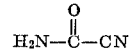

the structure of the enol form would be written as in Flowsheet (a) above with $R_1$ representing hydrogen:

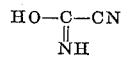

To produce 3-chloro-4-alkoxy-1,2,5-thiadiazole, a loweralkyl cyanoformimidate, such as methyl, ethyl, propyl, isopropyl or butyl cyanoformimidate is contacted with the sulfur mono- or dichloride. The alkyl radical is not changed during the reaction, so that a 3-chloro-4-loweralkoxy-1,2,5-thiadiazole is obtained wherein the nature of the loweralkoxy radical is determined by the particular alkyl cyanoformimidate used as starting material. Examples of 1,2,5-thiadiazoles obtained in this way are 3-chloro-4-ethoxy-1,2,5-thiadiazol, 3-chloro-4-n-propoxy-1,2,5-thiadiazole, 3-chloro-4-isobutoxy-1,2,5-thiadiazole, 3-chloro-4-isopropoxy-1,2,5-thiadiazole, and 3-chloro-4-methoxy-1,2,5-thiadiazole.

The stoichiometry of the process requires one mole of sulfur mono- or dichloride per mole of cyanoformamide or alkyl cyanoformimidate. At least this quantity of sulfur chloride is normally employed, and for best results it is preferred to use about 2–10 moles per mole of cyanoformamide or cyanoformimidate. Even larger excesses of chloride reactant can be used if desired for some particular reason, but generally are unnecessary.

As previously stated, the process is normally carried out in an organic solvent medium. When sulfur monochloride ($S_2Cl_2$) is one of the reactants, a non-protonic polar solvent such as a dialkylalkanoamide, e.g. dimethylformamide, dimethylacetamide, diethylformamide or tetrahydrofuran, is employed. With sulfur dichloride ($SCl_2$) similar dialkyl alkanoamides may serve as solvent media, and satisfactory formation of 3-chloro-4-$OR_1$-1,2,5-thiadiazole is also obtained in a non-polar solvent such as benzene, toluene, xylene, and the like.

The reaction time and temperature are not unduly critical; satisfactory results are achieved by contacting the reactants at temperatures of from 0° C. to 85° C. for ½–30 hours. As will be appreciated by those skilled in this art, the time and temperature conditions are interdependent, with higher temperature permitting shorter reaction times. For optimum results, the cyanoformamide or alkyl cyanoformimidate and sulfur mono- or dichloride are reacted together for about 1–20 hours at from 0°–60° C. The 3-chloro-4-$OR_1$-1,2,5-thiadiazoles thus obtained, where $R_1$ is as defined above, may be recovered from the reaction mass by known techniques. For instance, the mixture may be quenched in water and the thiadiazole either steam-distilled or extracted into a water-immiscible organic solvent such as ether from which it is recovered after removal of the solvent. The 3-chloro-4-alkoxy-1,2,5-thiadiazoles are relatively low boiling under reduced pressure, so that vacuum distillation is a convenient technique for obtaining them in substantially pure form.

In accordance with a further aspect of this invention, 3 - chloro - 4 - hydrocarbonyloxy - 1,2,5 - thiadiazoles of Formula III above are prepared from 3-chloro-4-hydroxy-1,2,5-thiadiazole by treatment of this latter substance with a hydrocarbonylating agent. This is the process of Flowsheet (b). In this way there are provided 3-chloro-1,2,5-thiadiazole compounds having at the 4-position an alkoxy, alkenyloxy, alkoxyalkoxy, hydroxyalkoxy or benzyloxy radical. The process is effected by contacting the 3 - chloro - 4-hydroxy-1,2,5-thiadiazole and hydrocarbonylating agent in a suitable reaction solvent and in the presence of a base which serves as an acid binding agent.

As the hydrocarbonylating agent there is employed an ester of an alcohol of the formula $R_2$–OH and a strong acid, where $R_2$ is loweralkyl, loweralkenyl, alkoxyalkyl, hydroxyalkyl or benzyl. It is preferred to employ a loweralkyl, loweralkenyl, alkoxyalkyl, hydroxalkyl or benzyl halide, such as a bromide, iodide or chloride although sulfate and sulfonate esters may be used satisfactorily if desired. Examples of suitable reactants are ethyl iodide, n-propyl bromide, n-butyl iodide, allyl bromide, allyl chloride, methallyl chloride, crotyl iodide, methyl bromide, benzyl chloride, diethyl sulfate, alkyl or alkenyl esters of methanesulfonic acid and p-toluenesulfonic acid, isopropyl bromide, β-methoxyethyl bromide, α-bromoethanol and the like. The reaction is brought about in a solvent such as dimethyl formamide, dimethylacetamide, acetone, methyl ethyl ketone and the like. As acid binding agent there may be used an alkali metal carbonate or bicarbonate, a tertiary amine such as trimethylamine, triethylamine and the like. Good results are realized by using a 5–50% molar excess of hydrocarbonylating agent, and heating the reaction mixture at temperatures of from about 25°–90° C. for ½–5 hours. If desired, a small amount of alkali metal iodide may be added to the mixture to catalyze the desired reaction. On completion of the reaction, the 3-chloro-4-OR$_2$-1,2,5-thiadiazole may be recovered by known procedures, for example by steam distillation or by extraction into a suitable organic solvent such as diethyl ether followed by removal of solvent. It will be noted that this hydrocarbonylation reaction affords a second method for preparing 3-chloro-4-alkoxy-1,2,5-thiadiazoles.

Representative examples of new 1,2,5-thiadiazoles provided by the processes described above (in addition to those previously mentioned) are 3-chloro-4-allyloxy-1,2,5-thiadiazole,
3-chloro-4-crotyloxy-1,2,5-thiadiazole,
3-chloro-4-methallyloxy-1,2,5-thiadiazole,
3-chloro-4-benzyloxy-1,2,5-thiadiazole,
3-chloro-4-ethoxy-1,2,5-thiadiazole,
3-chloro-4-n-butoxy-1,2,5-thiadiazole,
3-chloro-4-β-methoxyethoxy-1,2,5-thiadiazole and
3-chloro-4-β-hydroxyethoxy-1,2,5-thiadiazole.

In accordance with an additional embodiment of this invention, there is provided a second method for obtaining 3-chloro-4-hydroxy-1,2,5-thiadiazole which method comprises the ether cleavage of a 3-chloro-4-OR$_2$-1,2,5-thiadiazole in which $R_2$ is as earlier defined. This is effected by contacting the 4-OR$_2$-thiadiazole with a strong Lewis acid under non-aqueous conditions. Suitable ether-cleaving Lewis acids are aluminum chloride, aluminum bromide, boron trifluoride and the like. The reaction is conducted in an inert organic solvent such as toluene, benzene, xylene or the like, using from about a 5–50% molar excess of Lewis acid, and heating the mixture at a temperature of from about 70°–170° C. for about ½–5 hours.

The following examples are given for the purpose of illustration and not by way of limitation.

EXAMPLE 1

(A) 7.0 grams (0.1 mole) of 1-cyanoformamide is added to a solution of 32.4 ml. (54 gm.; 0.4 moles) of sulfur monochloride in 40 ml. of dimethyl formamide. The addition is carried out at room temperature over a 10 minute period. The resulting mixture is stirred for four hours at room temperature and then poured into 320 ml. of ice water. The resulting solution is filtered and the aqueous filtrate extracted with four 75 ml. portions of ethyl ether. The ether extracts are combined and washed with a small amount of water. They are then dried over magnesium sulfate and concentrated to dryness in vacuo. The residue that is obtained weighs 12 g. and consists predominantly of 3 - chloro - 4 - hydroxy - 1,2,5-thiadiazole. The product is recrystallized from water to give substantially pure material, M.P. 110–112° C.

(B) 7.0 grams (0.1 mole) of 1-cyanoformamide is added at room temperature to a mixture of 41.2 g. (0.4 mole) of sulfur dichloride in 40 ml. of benzene. The mixture is stirred for five hours at 60° C., then cooled and poured into 300 ml. of ice water. The mixture is filtered and the benzene layer of the filtrate separated. The remaining aqueous layer is washed with 2× 50 ml. of ethyl ether, and the ether washes added to the benzene solution. The combined benzene-ether solution is evaporated to dryness in vacuo to give a residue of 3-chloro-4-hydroxy-1,2,5- thiadiazole. It is purified by recrystallization from water.

EXAMPLE 2

11.2 grams of isopropyl cyanoformimidate (0.1 mole) is added dropwise to a solution of 40.5 g. (0.3 mole) of sulfur monochloride in 50 ml. of dimethyl formamide. The addition is carried out at a temperature of about 15–20° C. The mixture is stirred at room temperature for 16 hours and then added to 200 ml. of water. The resulting mixture is steam distilled. The distillate is extracted with two 20 ml. portions of petroleum ether to remove the 3-chloro-4-isopropoxy-1,2,5-thiadiazole. The ethereal extracts are combined and the solvent removed by distillation. The residue is distilled in vacuo to give substantially pure 3-chloro-4-isopropoxy-1,2,5-thiadiazole, B.P. 68–69° C./15 mm.;

$$\lambda_{max.}^{CH_3OH}(E\ percent) = 280\ (533),\ 283\ (526)$$

The product may be purified further by dissolving in water, extracting the aqueous solution with ethyl ether, and recovery of product from the ether extract.

When the above process is carried out employing 9.8 g. of ethyl cyanoformimidate or 8.4 g. of methyl cyanoformimidate, there is obtained, respectively, 3-chloro-4-ethoxy-1,2,5-thiadiazole, B.P. 86.5–87.5° C./17 mm.;

$$\lambda_{max.}^{CH_3OH}(E\ percent) = 278\ (561)$$

and 3-chloro-4-methoxy-1,2,5-thiadiazole, B.P. 63° C./17 mm.; M.P. 53–54.5° C.;

$$\lambda_{max.}^{CH_3OH}(E\ percent) = 278\ (609)$$

3-chloro-4-n-propoxy-1,2,5-thiadiazole is obtained by repeating the above process with n-propyl cyanoformimidate as starting material instead of isopropyl cyanoformimidate.

EXAMPLE 3

11.2 grams (0.1 mole) of isopropyl cyanoformimidate is added slowly to a solution of 52 g. of 60% sulfur dichloride (0.3 mole) in 30 ml. of benzene. The addition is carried out with stirring at 0–5° C. The mixture is then allowed to warm to room temperature and stirred for six hours at 25° C. At the end of this time 200 ml. of water is added and the resulting mixture distilled at atmospheric pressure until the vapor temperature reaches 100° C. Both the benzene solvent and 3-chloro-4-isopropoxy-1,2,5-thiadiazole distill. The organic solvent layer of the distillate is separated from the aqueous layer, washed with water, and dried over magnesium sulfate. It is then fractionally distilled; the benzene distills first and then 3-chloro-4-isopropoxy-1,2,5-thiadiazole, B.P. 68–69° C./15 mm.

EXAMPLE 4

A mixture of 1.36 g. (10 mmoles) of 3-chloro-4-hydroxy-1,2,5-thiadiazole, 1.06 g. (11 mmoles) of sodium carbonate, 13.3 mmoles of hydrocarbonyl halide, and 0.12 g. (0.8 mmole) of sodium iodide in 25 ml. of dimethyl formamide is heated at 55–60° C., with stirring, for the reaction time stated in Table I. 150 ml. of water is then added to the reaction mixture and the entire mixture extracted with 3× 25 ml. of ether. The ether extracts are combined, dried over magnesium sulfate and concentrated to dryness in vacuo. The residual product is 3-chloro-4-hydrocarbonyloxy-1,2,5-thiadiazole. Additional details of specific experiments using this method are set out in Table I below.

TABLE I

| Hydrocarbonyl halide | Reaction time (minutes) | End product | Yield (percent) |
|---|---|---|---|
| (a) Allyl bromide | 75 | 3-chloro-4-allyloxy-1,2,5-thiadiazole. | 90 |
| (b) Isopropyl iodide | 20 | 3-chloro-4-isopropoxy-1,2,5-thiadiazole. | 63 |
| (c) n-Propyl iodide | 25 | 3-chloro-4-n-propoxy-1,2,5-thiadiazole. | 86 |
| (d) n-Butyl bromide | 60 | 3-chloro-4-n-butoxy-1,2,5-thiadiazole. | 75 |
| (e) Benzyl chloride | 60 | 3-chloro-4-benzyloxy-1,2,5-thiadiazole. | 90 |
| (f) Crotyl bromide | 75 | 3-chloro-4-crotyloxy-1,2,5-thiadiazole. | 89 |
| (g) Methallyl bromide | 75 | 3-chloro-4-methallyl-oxy-1,2,5-thiadiazole. | 86 |
| (h) β-Methoxyethyl bromide. | 60 | 3-chloro-4-β-methoxy-ethoxy-1,2,5-thiadiazole. | 55 |
| (i) α-Bromoethanol | 120 | 3-chloro-4-β-hydroxy-ethoxy-1,2,5-thiadiazole. | 49 |

EXAMPLE 5

1.36 grams (10 mmoles) of 3-chloro-4-hydroxy-1,2,5-thiadiazole, 1.5 g. (15 mmoles) of triethylamine, and 15 mmoles of hydrocarbonyl halide are added to 25 ml. of dry acetone and the resulting mixture refluxed for the times set out in Table II below. At the end of this time the acetone and triethylamine are removed by distillation. The residue is dissolved in a minimum volume of ethyl ether. The ethereal solution is washed with water, dried over magnesium sulfate and concentrated to dryness in vacuo to give the 3-chloro-4-hydrocarbonyloxy-1,2,5-thiadiazole listed in Table II.

TABLE II

| Hydrocarbonyl halide | Reaction time (hours) | End product | Yield (percent) |
|---|---|---|---|
| (a) Ethyl bromide | 17 | 3-chloro-4-ethoxy-1,2,5-thiadiazole. | 73 |
| (b) β-Methoxyethyl-bromide. | 19 | 3-chloro-4-β-methoxy-ethoxy-1,2,5-thiadiazole. | 62 |
| (c) α-Bromoethanol | 20 | 3-chloro-4-β-hydroxy-ethoxy-1,2,5-thiadiazole. | 89 |

EXAMPLE 6

A mixture of 1.28 g. (0.0072 mole) of 3-chloro-4-isopropoxy-1,2,5-thiadiazole and 1.28 g. (0.0096 mole) of aluminum chloride in 10 ml. of toluene is refluxed for two hours. At the end of this time the reaction mixture is cooled to about room temperature and extracted with 10 ml. of 2.5 N hydrochloric acid. The acidic aqueous extract is back-extracted with 2× 5 ml. of toluene. The toluene solutions are combined, dried over magnesium sulfate, and then concentrated to dryness in vacuo to afford a residue of 3-chloro-4-hydroxy-1,2,5-thiadiazole, M.P. 109–112° C.

The new and novel 3-chloro-4-OR-1,2,5-thiadiazoles of Formula I above are useful in that they are important intermediates in a synthesis of sulfanilamido-1,2,5-thiadiazoles of the structure

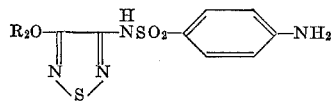

where $R_2$ is as previously defined, which substances exhibit significant activity against the poultry disease coccidiosis as well as against certain bacteria. These sulfathiadiazoles, their use as antiparasitic and antibacterial agents, and the synthesis thereof, is not a part of the present invention, but is rather a different invention which is described and claimed in a separate patent application filed on even date herewith.

The 3-chloro-4-hydroxy-1,2,5-thiadiazoles of the present invention are converted to 3-chloro-4-OR$_2$-1,2,5-thiadiazoles, where $R_2$ is loweralkyl, loweralkenyl, loweralkoxyloweralkyl, hydroxyloweralkyl or benzyl, by the hydrocarbonylation process described in detail above. The 3-chloro-4-OR$_2$-1,2,5-thiadiazoles ($R_2$ being as just defined) are converted to corresponding sulfathiadiazoles by reacting them with sulfanilamide in the presence of a base. An illustrative, detailed method of carrying out this reaction to make 3-allyloxy-4-sulfanilamido-1,2,5-thiadiazole is set forth below. The 3-chloro-4-OR$_2$-1,2,5-thiadiazole compounds of this invention are reacted under similar conditions with sulfanilamide to obtain the corresponding 3-OR$_2$-4-sulfanilamido-1,2,5-thiadiazole.

A mixture of 15.6 g. of 3-chloro-4-allyloxy-1,2,5-thiadiazole, 50.3 g. of sulfanilamide, 40.4 g. of potassium carbonate, and 15.0 g. of acetamide is heated at 145° C. for 25 minutes. The mixture is then cooled to 100° C., 200 ml. of water added, and the mixture distilled to a vapor temperature of 100° C. to remove any unchanged 3-chloro-4-allyloxy-1,2,5-thiadiazole. The residual mixture is then cooled to room temperature and the pH adjusted to 8.8 by addition of hydrochloric acid. Unchanged sulfanilamide precipitates and is separated by filtration and washed with water. The aqueous filtrate and washes are combined and acidified to pH 4.0 with hydrochloric acid. 3-allyloxy-4-sulfanilamido-1,2,5-thiadiazole precipitates. It is filtered off and washed with water. This product is recrystallized from 500 ml. of 50% isopropanol, after treating the isopropanol solution with 5 g. of decolorizing charcoal, to yield 15.3 g. of pure 3-allyloxy-4-sulfanilamido-1,2,5-thiadiazole, M.P. 153–155° C.

Certain of the loweralkyl cyanoformimidates used as starting materials in the process of this invention are known compounds. Both these and those not specifically described in the art may be prepared as follows: Chlorine gas is passed into a mixture of 4.7 moles of isopropanol, 1.94 moles of sodium cyanide, and 800 ml. of water, maintaining the temperature between —10° and —15° C. 1.0 mole of chlorine gas is added over a period of about 50 minutes. The mixture is then aged for three hours at —5 to —10° C. (pH 9–10), then extracted with 3× 150 ml. of ethyl ether. The ether extracts are combined, washed with 3× 50 ml. of aqueous saturated sodium chloride and dried over magnesium sulfate. The ether is then removed by distillation, and the residue vacuum distilled. Isopropyl cyanoformimidate distils at 35–38° C./15 mm. The other lower alkyl cyanoformimidates, which are low-boiling liquids, are obtained in similar fashion by substituting the appropriate lower alkanol for isopropanol.

Any departure from the above description which conforms to the present invention is intended to be included within the scope of the claims.

What is claimed is:
1. A 1,2,5-thiadiazole compound having the formula

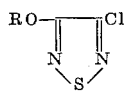

where R represents hydrogen, loweralkyl, loweralkenyl, loweralkoxyloweralkyl, hydroxyloweralkyl or benzyl.
2. 3-chloro-4-hydroxy-1,2,5-thiadiazole.
3. 3-chloro-4-loweralkoxy-1,2,5-thiadiazole.
4. 3-chloro-4-loweralkenyloxy-1,2,5-thiadiazole.
5. 3-chloro-4-allyloxy-1,2,5-thiadiazole.
6. 3-chloro-4-n-propoxy-1,2,5-thiadiazole.
7. 3-chloro-4-ethoxy-1,2,5-thiadiazole.
8. The method for preparing a compound of the formula

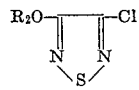

where $R_2$ represents loweralkyl, loweralkenyl, loweralkoxyloweralkyl, hydroxyloweralkyl or benzyl, that comprises reacting 3-chloro-4-hydroxy-1,2,5-thiadiazole with a substance of the formula

in the presence of a base selected from the group consisting of tertiary amines, alkali metal carbonates or alkali metal bicarbonates, where $R_2$ is as previously defined and Y is the anion of a strong acid.
9. The method for preparing 3-chloro-4-loweralkenyloxy-1,2,5-thiadiazole that comprises reacting together 3-chloro-4-hydroxy-1,2,5-thiadiazole and a loweralkenyl halide in the presence of a base selected from the group consisting of tertiary amines, alkali metal carbonates or alkali metal bicarbonates.
10. The method for preparing 3-chloro-4-loweralkoxy-1,2,5-thiadiazole that comprises reacting together 3-chloro-4-hydroxy-1,2,5-thiadiazole and a loweralkyl halide in the presence of a base selected from the group consisting of tertiary amines, alkali metal carbonates or alkali metal bicarbonates.
11. The method for preparing 3-chloro-4-allyloxy-1,2,5-thiadiazole that comprises reacting together 3-chloro-4-hydroxy-1,2,5-thiadiazole and allyl halide in the presence of a base selected from the group consisting of tertiary amines, alkali metal carbonates or alkali metal bicarbonates.
12. The method for preparing 3-chloro-4-n-propoxy-1,2,5-thiadiazole that comprises reacting together 3-chloro-4-hydroxy-1,2,5-thiadiazole and n-propyl halide in the presence of a base selected from the group consisting of tertiary amines, alkali metal carbonates or alkali metal bicarbonates.

References Cited

UNITED STATES PATENTS

| | | |
|---|---|---|
| 3,068,238 | 12/1962 | Ross et al. |
| 3,115,497 | 12/1963 | Vest et al. |
| 3,117,973 | 1/1964 | Ross et al. |

FOREIGN PATENTS

| | | |
|---|---|---|
| 1,175,683 | 8/1964 | Germany. |
| 858,189 | 1/1961 | Great Britain. |

OTHER REFERENCES

Ross et al.; J. Am. Chem. Soc., vol. 86, (1964), pp. 2861–8.
Richter; Organic Chemistry, 1952, p. 442.

NICHOLAS S. RIZZO, *Primary Examiner.*

R. J. GALLAGHER, *Assistant Examiner.*

U.S. Cl. X.R.
167—33, 65; 260—239.5, 306.7